United States Patent [19]
Bradley

[11] 3,800,593
[45] Apr. 2, 1974

[54] GAS SAMPLING APPARATUS FOR CHROMATOGRAPHS

[75] Inventor: M. P. Timothy Bradley, Shaker Heights, Ohio

[73] Assignee: The Standard Oil Company, Cleveland, Ohio

[22] Filed: Oct. 3, 1972

[21] Appl. No.: 294,671

[52] U.S. Cl. .......................... 73/422 GC, 73/23.1
[51] Int. Cl. ............................................. G01n 1/10
[58] Field of Search ...................... 73/422 GC, 23.1

[56] References Cited
UNITED STATES PATENTS
3,426,599  2/1969  Krull ............................. 73/422 GC
3,511,080  5/1970  Roof ............................. 73/422 GC

*Primary Examiner*—S. Clement Swisher
*Attorney, Agent, or Firm*—John F. Jones; Sherman J. Kemmer; Evelyn Kasman

[57] ABSTRACT

A gas sampling apparatus for use in conjunction with a gas chromatograph in which there are no moving parts in the sample flow path, and the size of the sample is controlled and measured by the pressure differential between the carrier gas and the sample gas and the time for which the sample gas pressure exceeds the carrier gas pressure.

3 Claims, 1 Drawing Figure

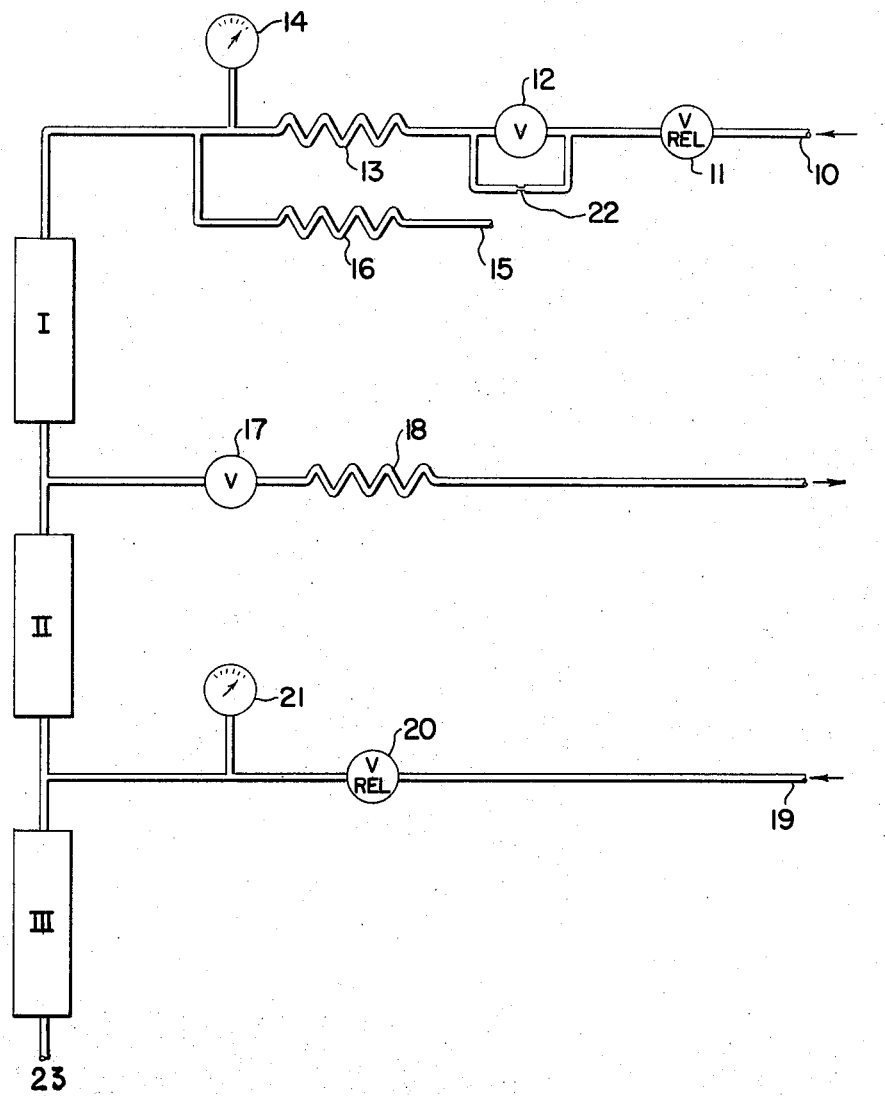

GAS SAMPLING APPARATUS FOR CHROMATOGRAPHS

This invention relates to a gas sampling apparatus for gas chromatographs. More particularly, this invention pertains to a gas sampling apparatus that contains no moving parts in the sample flow path, and wherein the sample size is controlled by means of pressure differential and precise timing.

Heretofor, gas sampling valves for gas chromatographs have had a number of disadvantages, such as, the necessity for close machining tolerances for component parts, the need for flexible gas tight seals, and limitations as to temperature and size of samples to be analyzed. The above limitations have now been overcome with the sampling apparatus of the present invention, wherein there are no moving parts in the sample flow path, there is no need to restrict sample temperature or sample size, and trace components in the sample can be readily determined without prior sample concentration.

The sampling device of this invention may be applied to any sample mixture which has an appreciable vapor pressure at the temperature of separation, and the temperature of the sample stream entering the chromatographic column through this sampling system is restricted only by the materials of construction of the sampling apparatus. Another important advantage of the gas sampling system of this invention is its inherent accuracy due to the use of the element of time in conjunction with pressure differential in the control of sample size, since time can be more accurately measured and controlled than volume.

The instant gas sampling system is particularly applicable to the sampling of refinery or chemical plant streams for chromatographic analysis which, at present, is difficult due to the limitations of the valve injection systems now in use. Additionally, this system is well suited to the automatic monitoring and control of processes involving both volatile liquids and gases.

The sampling apparatus of this invention is a replacement for the gas sample valve of a chromatographic unit. In this system the pressure differential between the pressures of the carrier gas and that of the sample gas is utilized to change the direction of the gas sample entering the chromatographic column.

A better understanding of the invention can be obtained from the following explanation taken in conjunction with a schematic diagram which illustrates the sampling apparatus in connection with the gas-chromatographic column.

Referring now to the drawing, the apparatus comprises a connecting conduit system containing a carrier gas inlet 10; a pressure regulator 11 for regulating the pressure of the carrier gas in the conduit; a first tap 12 which may be a cock, a solenoid valve, or the like; a pressure gauge 14 which records the pressure of the carrier gas in the conduit at the column head of chromatographic column I; in a conduit arm extending from the carrier gas conduit downstream of pressure gauge 14 a sample stream entry 15 in the conduit arm; a restrictor 16 in the conduit arm which may consist of capillary tubing, a sintered disc, an orifice plate, or a variable restrictor such as a needle valve, and which functions to minimize back diffusion of the sample gas in the sample gas conduit; in a side arm conduit extending from the connecting conduit between chromatographic columns I and II a tap 17 as in 12 to control the flow of gas in chromatographic column I; a restrictor 18 which may be of the same type as 16 to control the flow rate of the gas issuing from column I; and a detector 23 equipped with a recording system capable of detecting changes in the chemical composition of the gas stream issuing from chromatographic column III. Chromatographic columns II and III are packed with chromatographic absorbents, and column I may be packed with either an inert material or a chromatographic absorbent. The chromatographic absorbent employed in these columns may be any absorbent ordinarily used in gas chromatographic analysis.

Optional features of the system include a T-piece 22 or a slow leak vent which by-passes valve 12 and which serves as an additional precaution in preventing sample diffusion in the carrier gas line when the tap 12 is closed; and a restrictor 13 which may be of the same type as 16 to minimize back diffusion of sample gas into the carrier gas line in the direction of 13. Although it is more preferable to include restrictor 13 in the system, either restrictor 13 and/or T-piece 22 may be advantageously incorporated into the system. It is also contemplated that chromatographic columns II and III are optional, provided column I is packed with a chromatographic absorbent.

Another optional feature of the system is a secondary carrier gas line extending from the conduit connecting columns II and III, and containing a secondary carrier gas entry 19; a pressure regulator 20 for regulating secondary carrier gas inlet pressure; and pressure gauge 21 to measure pressure of the carrier gas at the head of column III. The purpose of the secondary carrier gas feed is to maintain a constant volume flow of carrier gas through detector 23 so as to stabilize the operation of the detector during the sampling sequence.

In the operation of the above-described gas sampling system, while in a rest position, pressure exerted by the carrier gas on the column head gauge 14 is greater than the pressure at the restrictor 16 provided by the sample gas, and the carrier gas flows through the restrictor 13 into the sample stream and into column I, and if included in the system into columns II and III. When tap 12 is in a closed position and tap 17 is open, the pressure of the carrier gas at gauge 14 decreases and becomes less than the pressure of the sample gas at 15 and sample flows through the restrictor 16 and into and through columns I. The volume of the sample injected into the system is dependent upon the difference between the sample stream pressure and the column head pressure during sampling, which may be less than or greater than atmospheric pressure, and on the time for which the pressure at 15 is greater than at 14. Sampling repeatability is limited by the repeatability of the time for sample gas entry and the stability of the pressures of the sample and carrier gas streams.

When the components to be analyzed in the sample are adsorbed in column I, the sample gas may be allowed to flow through tap 17, if the residual sample gas has essentially the same viscosity as the carrier gas without affecting sampling repeatability. The timing employed, however, should preferably be so regulated that the sample front does not reach the downstream end of column I before the taps are reactivated to open 12 and to close 17.

Various modifications of the apparatus described herein may be employed without departing from the spirit or scope of this invention, and this application is intended to cover all such modifications which would reasonably fall within the scope of the appended claims.

I claim:

1. A gas sampling apparatus for a gas chromatographic unit comprising:
   A. a carrier gas conduit containing a carrier gas inlet situated at one end of the conduit;
   B. a pressure regulator disposed in said conduit and in communication with said carrier gas inlet;
   C. a first tap means in communication with (B) to control carrier gas feed in the carrier gas conduit;
   D. a chromatographic column having an inlet and an outlet;
   E. a pressure gauge positioned between and operatively associated with (C) and the inlet of (D) to measure the pressure of the carrier gas at inlet (D);
   F. a conduit arm extending from (A) at a position between (E) and the inlet of (D);
   G. a sample gas inlet in said conduit arm and communicating with the inlet of (D) and (E);
   H. a restrictor means in (F) positioned between (G) and the inlet of (D);
   I. a second tap means communicating with the outlet of (D) to control the rate of flow of the sample gas in the column;
   the volume of the sample gas injected into (D) being dependent upon the pressure differential between the pressure of the carrier gas and that of the sample gas at the inlet of (D), and the time for which the sample gas pressure exceeds the carrier gas pressure.

2. The gas sampling apparatus of claim 1 including a slow leak vent and a restrictor element disposed in (A); said slow leak vent by-passing (C) and communicating with (B); and said restrictor element positioned between and communicating with said slow leak vent and (E).

3. The gas sampling apparatus of claim 2 including a second chromatographic column having an inlet and an outlet, the inlet of said second column communicating with the outlet of (D); and a secondary carrier gas conduit in communication with the outlet of said second chromatographic column, said secondary carrier gas conduit containing a secondary carrier gas entry, a second pressure regulator and a second pressure gauge, said second pressure regulator being situated between and communicating with the secondary carrier gas entry and the second pressure gauge, and the second pressure gauge being in communication with the outlet of said second chromatographic column.

* * * * *

PO-1050
(5/69)

UNITED STATES PATENT OFFICE
CERTIFICATE OF CORRECTION

Patent No. 3,800,593                   Dated April 2, 1974

Inventor(s) M. P. Timothy Bradley

It is certified that error appears in the above-identified patent and that said Letters Patent are hereby corrected as shown below:

Page 1      --       Attorney's name "Kasman" should be --Kosman--.

Page 1,     Title    In the title, after "FOR" insert --GAS--.

Column 1,   Title    In the title, after "FOR" insert --GAS--.

Signed and sealed this 18th day of March 1975.

(SEAL)
Attest:

RUTH C. MASON
Attesting Officer

C. MARSHALL DANN
Commissioner of Patents
and Trademarks